(12) United States Patent
Kleinewegen

(10) Patent No.: US 11,421,746 B2
(45) Date of Patent: Aug. 23, 2022

(54) CLUTCH AND METHOD FOR CONTACTLESS DETECTION OF WEAR ON THE CLUTCH

(71) Applicant: Flender GmbH, Bocholt (DE)

(72) Inventor: Stefan Kleinewegen, Bocholt (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/211,417

(22) Filed: Mar. 24, 2021

(65) Prior Publication Data

US 2021/0301887 A1 Sep. 30, 2021

(30) Foreign Application Priority Data

Mar. 25, 2020 (EP) .................................... 20165611

(51) Int. Cl.
*F16D 48/06* (2006.01)
(52) U.S. Cl.
CPC .......... *F16D 48/06* (2013.01); *F16D 2300/18* (2013.01); *F16D 2500/3027* (2013.01); *F16D 2500/5023* (2013.01); *F16D 2500/70668* (2013.01)

(58) Field of Classification Search
None
See application file for complete search history.

(56) References Cited

U.S. PATENT DOCUMENTS

| 4,567,972 A * | 2/1986 | Buch ....................... F16D 27/00 |
| | | 116/208 |
| 6,259,995 B1 | 7/2001 | Amberger et al. |

FOREIGN PATENT DOCUMENTS

| DE | 3545991 A1 | 8/1986 |
| DE | 19756451 C1 | 12/1998 |
| DE | 102006041812 A1 | 3/2008 |
| DE | 102014207670 A1 * | 10/2015 ............. F16D 11/14 |
| EP | 1998147 B1 | 2/2018 |
| WO | WO-2004063590 A1 * | 7/2004 ............. F16D 48/06 |

* cited by examiner

*Primary Examiner* — Timothy Hannon
(74) *Attorney, Agent, or Firm* — Henry M. Feiereisen LLC

(57) ABSTRACT

A clutch includes a first clutch half, a second clutch half, a first magnet arranged on the first clutch half, and a second magnet arranged on the second clutch half. The first and second magnets interact to enable a contactless detection of a state of wear of the clutch.

18 Claims, 7 Drawing Sheets

CLUTCH AND METHOD FOR CONTACTLESS DETECTION OF WEAR ON THE CLUTCH

CROSS-REFERENCES TO RELATED APPLICATIONS

This application claims the priority of European Patent Application, Serial No. EP20165611.3, filed 25 Mar. 2020, pursuant to 35 U.S.C. 119(a)-(d), the disclosure of which is incorporated herein by reference in its entirety as if fully set forth herein.

BACKGROUND OF THE INVENTION

The invention relates to a clutch and to a method for contactless detection of wear on the clutch.

The following discussion of related art is provided to assist the reader in understanding the advantages of the invention, and is not to be construed as an admission that this related art is prior art to this invention.

Clutches represent wear-afflicted components that require maintenance. There is a need to ascertain an existing state of wear in clutches.

It would therefore be desirable and advantageous to provide a precise, reliable and simple solution for ascertaining the existing state of wear in a clutch and to obviate other prior art shortcomings.

SUMMARY OF THE INVENTION

According to one aspect of the present invention, a clutch includes a first clutch half, a second clutch half, a first magnet arranged on the first clutch half, and a second magnet arranged on the second clutch half, wherein the first and second magnets interact to enable a contactless detection of a state of wear of the clutch.

In accordance with the invention, the clutch guides a drive power along an axis of rotation, i.e. a torque and a speed, from the first clutch half to the second clutch half. For this purpose, the clutch can, for example, be embodied as a claw clutch, gear clutch or multi-disk clutch. Between a wear-free and a wear-afflicted region, an offset is established between the first clutch half and the second clutch half along a circumferential direction along which the clutch rotates about the axis of rotation during operation. Wear of the clutch can be detected by arranging the first magnet on the first clutch half and arranging the second magnet on the second clutch half. Progressive wear can alter a circumferential clearance between the first and second magnets. This results in magnetic interaction between the first and second magnets that can be detected in a contactless manner. This kind of contactless detection can be realized by using suitable sensors with increased precision. The outlined change in the circumferential clearance between the first and second magnets represents a precisely detectable measure for the existing wear in the clutch. The first and second magnets do not require their own power supply and can be arranged in a simple manner on the first and second clutch halves Advantageously, the first and second magnets can be rigidly fixed to the first and second clutch halves. Therefore, an apparatus for detecting a magnetic interaction between the first and second magnets can be easily installed separately adjacent to the clutch. A clutch according to the invention offers precise detection of existing wear with reduced number of components that can be manufactured and installed in a cost-efficient manner.

The first and second magnets each generate a magnetic field. The magnetic fields of the first and second magnets interact and can create a combined magnetic field. The combined magnetic field lies in a region between the first and second magnets and in their surroundings. The first and second magnets are movable relative to one another by configuring the first and second clutch halves movable relative to one another. The first and second magnets can follow a relative motion between the first and second clutch halves along the circumferential direction so that their circumferential clearance changes. For this purpose, the first and second magnets can, for example, be arranged in an axial direction, i.e. along the axis of rotation of the clutch, adjacent to one another. In particular, the first and second magnets can be arranged on an outer surface of the first clutch half and the second clutch half, respectively. As a result, the magnetic interaction between the first and second magnets caused by a relative motion between the first and second clutch halves leads to an alteration to the combined magnetic field. This can in turn be detected in a contactless manner.

According to another advantageous feature of the invention, a third magnet can be arranged on the second clutch half. The second and third magnets are thus arranged spaced apart on the second clutch half in the circumferential direction. Advantageously, the second and third magnets can be arranged in such a way that, in the installed state of the clutch, the first magnet is positioned between the second and third magnets along the circumferential direction. This enables a unique combined magnetic field to be generated. For example, when the combined magnetic field is detected, time differences between passage of the first, second and third magnets can be ascertained by a sensor apparatus. Based on this, it is, for example, possible to identify the direction of rotation in which the clutch rotates. Moreover, the use of additional magnets, i.e. a third, fourth, etc. magnet, increases the achievable measuring accuracy.

According to another advantageous feature of the invention, the combined magnetic field may be altered by a change in a magnetic flux density, a change in a gradient of the magnetic flux density and/or a change of direction of magnetic field lines of the combined magnetic field. The gradient can hereby be a local or a temporal gradient. Alteration to the combined magnetic field relates to a local alteration representing a substantially point-like position within the combined magnetic field. A magnetic flux density can be measured precisely as can be a gradient of a magnetic flux density by multiple measurements at different positions. As a result, wear of the clutch creates precisely detectable measured variables which accordingly represent an exact measure for the existing state of wear.

According to another advantageous feature of the invention, the combined magnetic field can be altered in a region between the first and second magnets. As an alternative or in addition, the combined magnetic field can be altered in a region next to the first magnet or second magnet, i.e. axially externally. With a corresponding alignment of the magnets in the region between the first and second magnets, there is increased flux density and a higher gradient of the magnetic flux density in terms of magnitude, which is accordingly easy to identify clearly. Thus, the detection of the alteration in the region between the first and second magnets enables a particularly reliable ascertainment of the existing state of wear. Alternatively, the first and second magnets can be aligned such that the magnetic flux density between them is reduced. Accordingly, there is a clearly identifiable minimum of the magnetic flux density between the first and second magnets. In a region next to the first magnet or second magnet, the magnetic field lines have a loop shape. Thus, a measurement can be performed with increased precision in the region next to the first magnet or second magnet.

According to another advantageous feature of the invention, a wear-afflicted damping element can be arranged between the first and second clutch halves. The damping element can be configured substantially as a ring with a plurality of pressure bodies that protrude in a star-shaped manner. Furthermore, the damping element can be made of flexible material such as rubber or another elastomer. Damping elements of this kind can, for example, be used in claw clutches. As a result, a clutch according to the invention can be embodied as a claw clutch. Wear-afflicted damping elements display a sufficiently high wear that can be exactly measured. Thus, with corresponding clutches, it is possible to achieve increased accuracy when detecting the existing state of wear. Furthermore, a wear-afflicted damping element reduces high-frequency interference, which also results in an alteration to the combined magnetic field. This further simplifies ascertainment of the existing state of wear and at the same time increases reliability.

Alternatively, a clutch according to the invention can also be embodied as an elastomer clutch, e.g. as a plug-in clutch. As a further alternative, a clutch according to the invention can be embodied as a highly flexible clutch, e.g. as a tire clutch such as a solid rubber tire clutch. During operation, clutches of this kind have a high twist angle so that particularly precise detection of the state of wear is made possible. Furthermore, it is also possible to identify a brief overload situation with clutches of this kind. The higher the twist angle during operation as intended, the more accurately and reliably a brief overload situation can be identified on the clutch.

According to another aspect of the invention, a system includes a clutch including a first clutch half, a second clutch half, and first and second magnets arranged on the first and second clutch halves, respectively, for contactless detection of a state of wear of the clutch, with the first and second magnets forming a combined magnetic field, and a sensor apparatus including a sensor configured to detect a physical variable of the magnetic field.

The sensor of the sensor apparatus can be configured to detect the physical variable of the magnetic field in a contactless manner. The sensor apparatus thus is capable of detecting an alteration to the combined magnetic field on the clutch, which is in turn characteristic of the existing state of wear of the clutch. A sensor apparatus of this kind can be configured, maintained and exchanged separately. Accordingly, the sensor apparatus can be replaced without requiring the operation of the clutch to be interrupted. Thus, a system according to the invention can be manufactured in a modular manner, is more cost effective, and can also be configured to retrofit existing clutches.

According to another advantageous feature of the invention, the sensor apparatus can be arranged in a stationary manner in the surroundings of the system. For example, the sensor apparatus can be installed and constructed rigidly in the surroundings. As a result, the sensor apparatus can be positioned in a simple manner during installation and connected to a power supply and/or a communicative data connection. This avoids complex installation of conjointly rotating electronic components which are susceptible to high mechanical stress. This in turn allows the use of simple and cost-effective sensors for the sensor apparatus. Furthermore, the sensor apparatus can be arranged in such a way that it is able to detect at least one region of the combined magnetic field. For example, it is possible to detect the region between the first and second magnets on the clutch and/or a region next to the first magnet or second magnet. Depending on the requirements of the respective clutch, the sensor apparatus can be placed at a selectable position and thereby enable, for example, a particularly precise and/or reliable detection of the existing state of wear to be performed.

According to another advantageous feature of the invention, the sensor apparatus can be configured to detect the change in the magnetic flux density, the gradient of the magnetic flux density and/or the change of direction of magnetic field lines of the combined magnetic field. Physical variables of this kind can be detected quickly and precisely and allow an exact evaluation in order to ascertain the existing state of wear of the clutch.

According to another advantageous feature of the invention, the sensor can be embodied as a Hall sensor. Hall sensors permit contactless measurement of magnetic flux density with a sufficiently wide measuring range and a sufficiently high sampling rate. Furthermore, Hall sensors are compact which enables the sensor apparatus to be installed in a space-saving manner. Furthermore, Hall sensors can be embodied as gradient Hall sensors that allow a local gradient of the existing magnetic flux density. Overall, Hall sensors offer a high degree of measuring accuracy and measurement resolution, which in turn enables exact ascertainment of the existing state of wear in the clutch.

As an alternative, the sensor can also be embodied as a switch that can be actuated by the passage of a magnetic field. Sensors of this kind can, for example, be embodied as reed contacts. For example, the sensor apparatus can include a plurality of sensors embodied as switches of this kind, which are each assigned to a magnet. The sensors are actuated during passage of the corresponding magnet and a time difference between these actuations is detected. A state of wear of the clutch can be derived from this, taking into account further operating variables, such as, for example, the existing torque.

According to another advantageous feature of the invention, the first magnet can be arranged on the first clutch half and the second magnet and a third magnet can be arranged on the second clutch half. Two time differences can be detected between the three actuations created in this way of at least two of the sensors, which, as outlined, can be actuated as switches. This further increases the precision during the ascertainment of the state of wear.

According to still another aspect of the invention, a method for ascertaining a state of wear of a clutch having a first clutch half with a first magnet and a second clutch half with a second magnet, with the first and second magnets forming a combined magnetic field, includes initiating an intended operation of the clutch, detecting a physical variable of the combined magnetic field by a sensor apparatus, ascertaining a deviation between the combined magnetic field and a reference magnetic field based on the physical variable, and ascertaining a state of wear of the clutch as a function of the deviation between the combined magnetic field and the reference magnetic field, wherein the deviation of the combined magnetic field corresponds to a wear-induced twist angle between the first and second clutch halves.

In accordance with the invention, the combined magnetic field created by the first and second magnets can be altered by a relative motion between the first and second clutch halves. The intended operation can, for example, be embodied as a stationary operation, i.e. with a substantially constant speed. The establishment of the intended operation is followed by the detection of at least one physical variable of the combined magnetic field. The physical variable can be detected with a corresponding sensor apparatus. The physical variable of the combined magnetic field can, for example, be a magnetic flux density, a gradient of the magnetic flux density and/or a change in magnetic field lines of the combined magnetic field. The deviation between the combined magnetic field and a reference magnetic field can be ascertained based on the physical variable of the combined magnetic field. The reference magnetic field can, for example, correspond to the combined magnetic field in a wear-free state of the clutch, which is measured. The existing state of wear of the clutch can then be ascertained by the determined deviation. For this purpose, it is, for example, possible to define a threshold value for the deviation, wherein the existence of a state of wear requiring a warning or maintenance work is indicated when exceeding the threshold value or dropping below the threshold value. According to the invention, the deviation between the combined magnetic field and the reference magnetic field corresponds to a twist angle between the first and second clutch halves. The twist angle is created by wear.

According to another advantageous feature of the invention, the physical variable can be ascertained in a contactless manner. For this purpose, provision may be made for a sensor apparatus with a sensor, for example a Hall sensor. The sensor apparatus can be attached in a stationary manner in the surroundings of the clutch. This enables the method to be performed with a minimum of modifications or fittings on the clutch. Consequently, a method according to the invention can easily be performed, including when retrofitting an existing clutch.

According to another advantageous feature of the invention, the deviation between the combined magnetic field and the reference magnetic field can be ascertained by taking into account an existing torque in the clutch. A twist angle can be established between the first and second clutch halves in dependence on the existing torque. For example, in this way, a damping element can be compressed between the first and second clutch halves. To take into account the existing torque, it is, for example, possible to use a plurality of reference magnetic fields, which each refer to an existing torque. As a result, a method according to the invention can be carried out in a simple manner with a plurality of different operating states.

According to another advantageous feature of the invention, a measurement signal representing at least one detected physical variable of the combined magnetic field can be filtered for interference. This can, for example, relate to vibrations which also create an alteration to the combined magnetic field. In this way a corresponding frequency filter can, i.a., remove high-frequency signal components in the measurement signal. Alternatively, targeted evaluation of such a high-frequency signal component also enables targeted ascertainment of interference in the operation of the clutch and the output of a warning. As an alternative or in addition, it is also possible for the existing torque and/or the existing speed in the clutch to be taken into account. Accordingly, a characteristic of operationally-induced deformations in the clutch caused, for example, by the compression of damping elements, can be distinguished from the existing state of wear. Such speed-specific or torque-specific characteristics can, for example, be stored as a dataset in an evaluation unit.

According to still another aspect of the invention, provision can be made for a computer program product which can be stored on a data carrier in a remanent manner and is embodied to be stored and executed on an evaluation unit. The computer program product can be embodied entirely as software or hard-wired, i.e. as a FPGA, chip or microcontroller, or a combination thereof. Furthermore, the computer program product can have a monolithic or modular structure. A monolithic computer program product should be understood as one that can be executed on a signal hardware platform and that implements the range of functions. A modular computer program product is a system of a plurality of sub-programs that can be executed on different hardware platforms that interact via a communicative data connection and in this way implements the range of functions. The computer program product is embodied to receive and process measurement signals from a sensor apparatus with which a magnetic field is detected. A computer program product according to the invention can be used to execute a method, as described above.

According to still another aspect of the invention, an evaluation unit for evaluating a measurement signal from a sensor apparatus for detecting a physical variable of a magnetic field includes a memory, which stores data relating to a reference magnetic field, and a computing unit for executing a computer program product as set forth above.

According to still another aspect of the invention, an industrial application includes a drive unit including an output shaft, an output unit including an input shaft, and a clutch connecting the input shaft and the output shaft to one another in a torque-transmitting manner and configured as set forth above.

The drive unit can, for example, be embodied as an electric motor, internal combustion engine or hydraulic motor. The drive unit provides drive power to be transmitted to an output unit via the output shaft. The drive unit may find application, for example, in a mill, vertical mill, sugar mill, cement mill, rock crusher, conveyor belt, pump, roller press, apron conveyor, tube mill, rotary kiln, rotary mechanism, agitator, lifting apparatus, garbage compactor or scrap press. For this purpose, the output unit has an input shaft connected to the output shaft of the drive unit via a clutch according to the invention. The clutch together with a sensor apparatus can be part of a system with which the state of wear of the clutch can be detected. The use of a clutch according to the invention enables its state of wear to be detected precisely so that outages of the industrial application can be avoided. Furthermore, maintenance work on the clutch can be planned in a more targeted and cost-efficient manner thus increasing the economic efficiency of the industrial application.

According to still another aspect of the invention, a sensor apparatus includes a sensor embodied to detect at least one physical variable of a magnetic field. According to the invention, the sensor apparatus is used to ascertain the existing state of wear on a clutch having a first clutch half and a second clutch half. A sensor apparatus to detect a physical variable of a magnetic field offers a high degree of measuring accuracy and reliability that enable permanent continuous detection. A sensor apparatus according to the invention can be made compact and can hence easily be installed on an existing clutch. The fact that such a sensor apparatus detects the corresponding physical variable in a contactless manner eliminates the need for extensive installation work on the actual clutch halves. Therefore, the sensor apparatus can advantageously be combined with a clutch according to the invention. Furthermore, it is possible to carry out a method according to the invention on the corresponding sensor apparatus.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
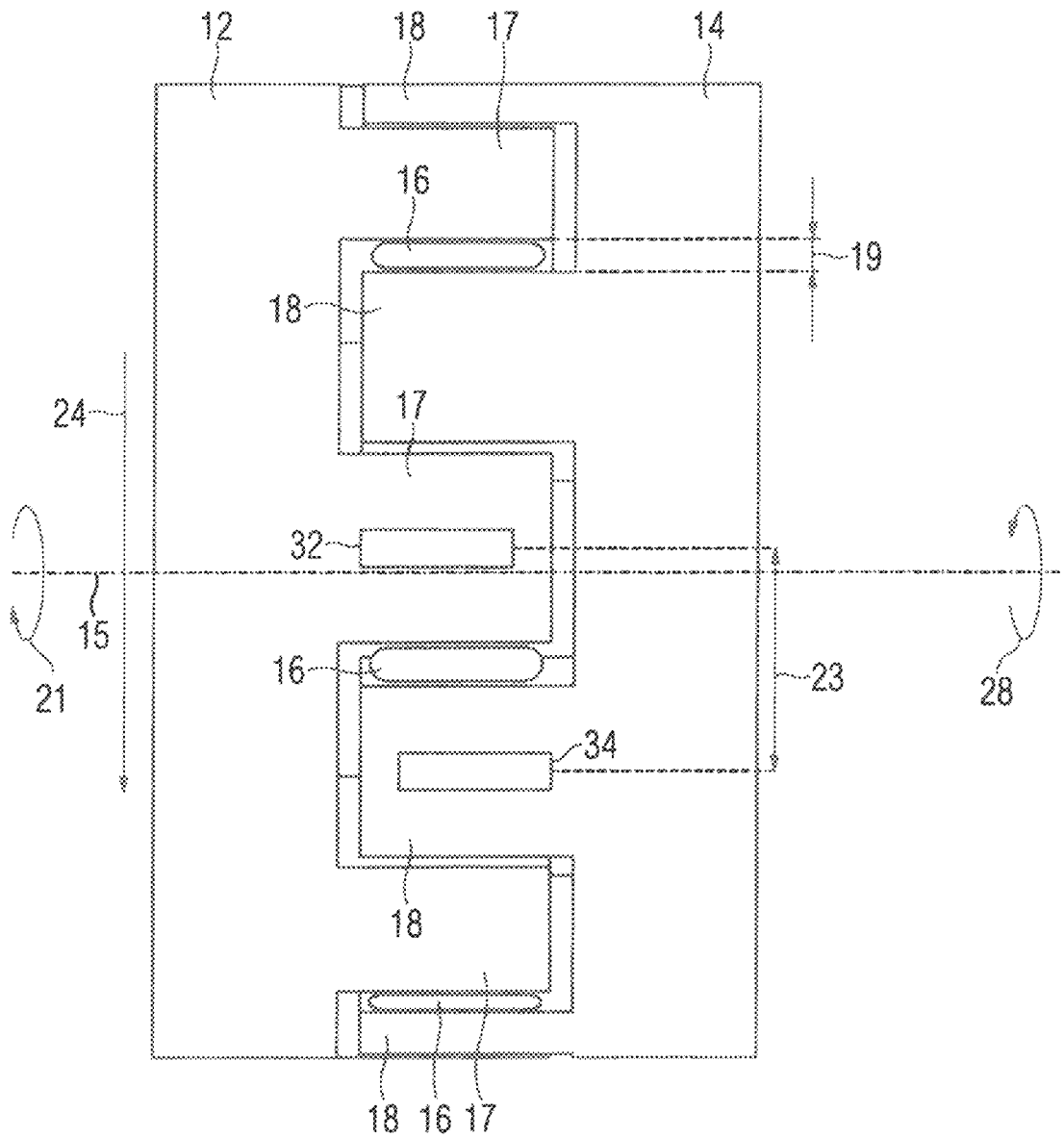
FIG. 1 is a schematic illustration of a first embodiment of a clutch according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first embodiment of a clutch according to the invention, generally designated by reference numeral 10. The clutch 10 includes a first clutch half 12 and a second clutch half 14. During operation, the clutch 10 rotates with a rotational speed, as indicated by arrow 21 about an axis of rotation 15 about which a torque is introduced. The first clutch half 12 has a plurality of first claws 17 and the second clutch half 14 has a plurality of second claws 18 so that the clutch 10 is embodied as a claw clutch. Flexible damping elements 16 made of rubber or an elastomer are arranged between the first and second claws 17, 18. The torque introduced into the first clutch half 12 drives a load, indicated by arrow 28, that belongs to an output unit, e.g. an output unit 84 as will be described in greater detail with reference to FIG. 8. This causes a circumferential motion, indicated by arrow 24, in a circumferential direction corresponding to the rotation direction of the torque, which circumferential motion is transmitted from the first clutch half 12 to the second clutch half 14. Each of the flexible damping elements 16 is hereby clamped between a first claw 17 and a second claw 18 and compressed by a compressive force. As a result, a circumferential clearance 19 is established between a first claw 17 and a second claw 18. Wear on the clutch 10, in particular on the flexible damping elements 16, causes a change in the circumferential clearance 19 between a first claw 17 and a second claw 18. This corresponds to a twist angle between the first and second clutch halves 12, 14.

A first magnet 32 is arranged on an outer surface of the first clutch half 12 in the region of a first claw 17, and a second magnet 34 is arranged on an outer surface of the second clutch half 14 in the region of a second claw 18. The first and second magnets 32, 34 are rigidly connected to the first and second clutch halves 12, 14, respectively. As a result, a relative motion between the first and second clutch halves 12, 14 along the circumferential direction leads to a corresponding relative motion between the first and second magnets 32, 34.

Figure 2:
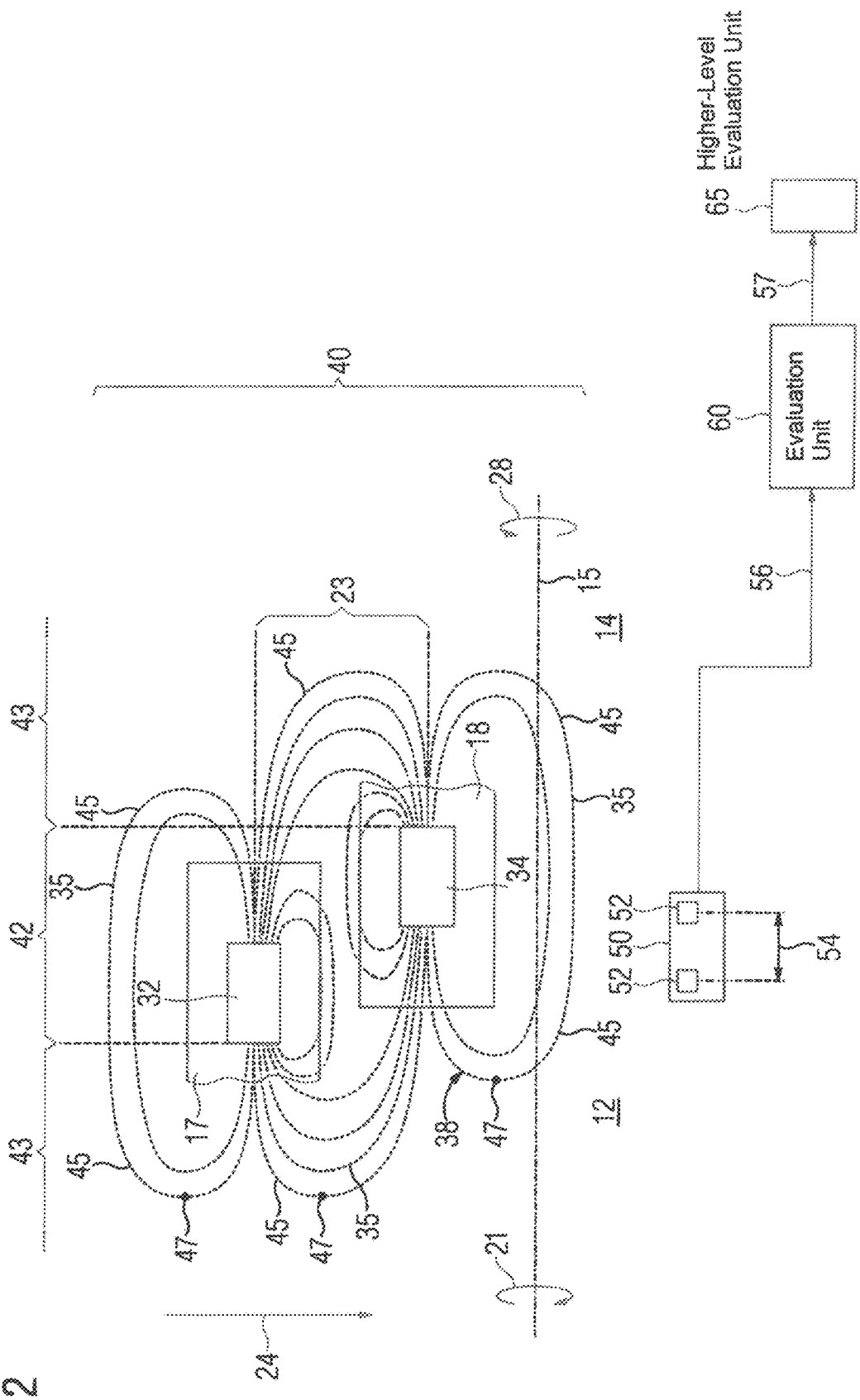
FIG. 2 is a schematic illustration of a detailed view of the clutch of FIG. 1.

FIG. 2 is a schematic illustration of a detailed view of the clutch 10 to describe structure and mode of operation of the clutch 10 in greater detail. As is apparent from FIG. 2, the first and second magnets 32, 34 are respectively arranged on the first claw 17 and the second claw 18 of the clutch halves 12, 14 (not shown in further detail) of the clutch 10. For ease of illustration, the flexible damping element 16 has been omitted in FIG. 2. The clutch 10 rotates about the axis of rotation 15 with a direction of rotation (arrow 21) along which the torque is introduced into the clutch 10 in order to drive the load 28 of the output unit. This results in the establishment of the circumferential motion (arrow 24) in circumferential direction. The first and second magnets 32, 34 generate magnetic field lines 35 which interact with one another. As a result, the first and second magnets 32, 34 generate a combined magnetic field 40. The combined magnetic field 40 has an increased magnetic flux density in a circumferential region between the first and second magnets 32, 34. A gradient of the flux density, in particular a local gradient, in the circumferential region is dependent on a circumferential clearance 23 between the first and second magnets 32, 34. The smaller the circumferential clearance 23 between the first and second magnets 32, 34, the higher the gradient in terms of magnitude. The magnetic flux density and/or the gradient of the magnetic flux density are detected by a sensor apparatus 50 having sensors 52. The sensors 52 are each embodied to detect at least one physical variable of the combined magnetic field 40. For this purpose, the sensor apparatus 50 is attached in a stationary manner in a central axial region 42 of the clutch 10. During circumferential motion of the clutch 10, the combined magnetic field 40 passes the sensor apparatus 50.

Moreover, the shape of the magnetic field lines 35 in the central axial region 42 and in marginal axial regions 43 is determined by the circumferential clearance 23 between the first and second magnets 32, 34. The magnetic field lines 35 extend substantially in a loop shape and accordingly have a field line angle 38 relative to the axis of rotation 15 when viewed from a radial direction. Between the first and second magnets 32, 34, three loops 45 are formed in the combined magnetic field 40 on each side in the marginal axial regions 43. Each of the loops 45 has a vertex 47 at which the field line angle 38 corresponds to a right angle. Furthermore, the field lines 35 emerge substantially perpendicularly at the poles of the first and second magnets 32, 34 from the first and second magnets 32, 34. Consequently, in the region of the first and second magnets 32, 34, the field line angle 38 corresponds to their alignment, when installed. The field line angle 38 of a field line 35 can be detected by the sensor apparatus 50 via the sensors 52 which are spaced from one another by an axial clearance indicated by arrow 54 and which thus form a gradient Hall sensor.

Upon passage of the combined magnetic field 40, the position of characteristic field line angles 38 can be detected by the sensor apparatus 50 in dependence on the circumferential clearance 23 between the first and second magnets 32, 34. Thus, the circumferential clearance 23 between the first and second magnets 32, 34 can be ascertained based on the detection of the field line angle 38 in a marginal axial region 43. Corresponding measurement signals are transmitted from the sensor apparatus 50 to an evaluation unit 60 via a communicative data connection 56. A reference magnetic field with which measurement results are compared is stored in the evaluation unit 60. For this purpose, the evaluation unit 60 includes a memory and a computing unit with which a computer program product can be executed. The computer program product is embodied to ascertain a state of wear of the clutch 10 based on the measurement signals from the sensor apparatus 50 through comparison with the reference magnetic field. The evaluation unit 60 is advantageously structured to ascertain the state of wear based on a detection of field line angles 38, a magnetic flux density and/or a gradient of the magnetic flux density.

The state of wear can be ascertained in two ways, on one hand based on measurements of the magnetic flux density in the circumferential region between the first and second magnets 32, 34, and on the other hand based on measurements of field line angles 38. Furthermore, the evaluation unit 60 is connected to a higher-level evaluation unit 65 via a communicative data connection 57. Calculated data is sent to the higher-level evaluation unit 65. The higher-level evaluation unit 65 includes a memory and a computing unit which is embodied to execute a computer program product for processing the calculated data. The computer program product in the higher-level evaluation unit 65 can, for example, belong to an experience database or perform a statistics function. The higher-level evaluation unit 65 can, for example, be embodied as a master computer, handheld device or computer cloud.

Figure 3:
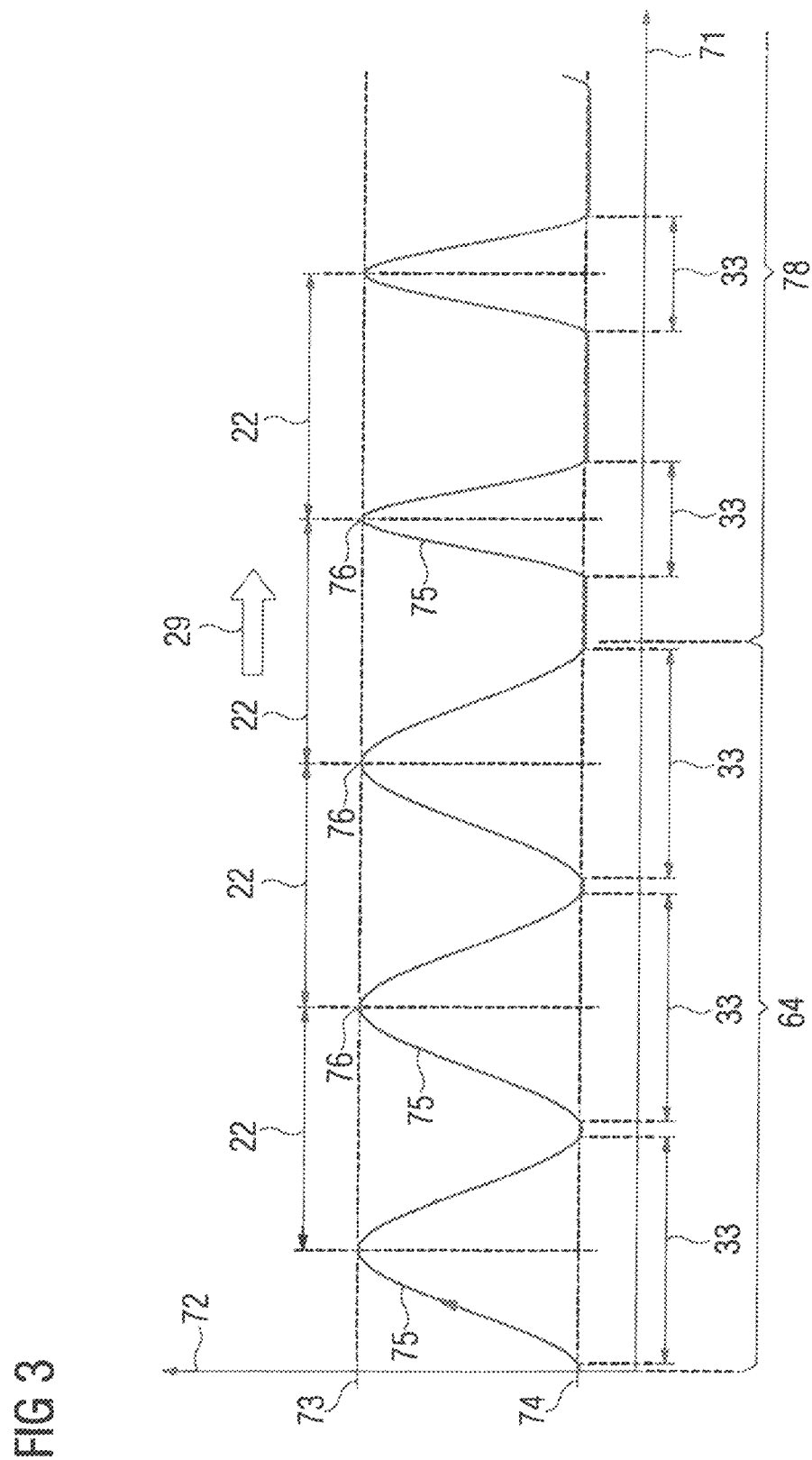
FIG. 3 is a diagram of a sequence of method steps in accordance with the invention for ascertaining a state of wear of the clutch.

FIG. 3 illustrates a diagram of a sequence of method steps in accordance with the invention for ascertaining a state of wear of the clutch 10, as depicted by way of example in FIG. 1 or FIG. 2. FIG. 3 assumes the first method step, in which an intended operating state of the clutch 10 is initiated and has been completed. The diagram in FIG. 3 has a horizontal time axis 71 corresponding to the sequence of the circumferential motion of the clutch 10, and a vertical value axis 72 on which a magnetic flux density is plotted as a physical variable of a combined magnetic field 40. The diagram of FIG. 3 substantially shows the course of measurement signals resulting at the sensor apparatus 50 during circumferential motion of the clutch 10.

Upon passage of the combined magnetic field 40, the magnetic flux density has a repeating maximum, as indicated by broken line 73. The maxima 73 correspond to a maximum magnetic flux density resulting in the circumferential region between the first and second magnets 32, 34. The magnetic flux density detected by the sensor apparatus 50 also periodically reaches a minimum as indicated by broken line 74 when the first and second magnets 32, 34 are located on a side of the clutch 10 facing away from the sensor apparatus 50. The minima 74 and maxima 73 are reached in a period 22 corresponding to the rotational speed of the clutch 10. In a wear-free operating state, the course of the magnetic flux density displays a gradient which leads to an increased pulse width 33 of the measurement signal over the time axis 71. The gradient, which, for example, in FIG. 2 corresponds to a local gradient, is resolved as a time gradient 75 in the measurement signal by the circumferential motion 24 which passes the sensor apparatus 50. The pulse width 33, the gradient 75 of the magnetic flux density and also a curvature 76 that can be determined therefrom in the course of the measurement signal each form a physical variable of the combined magnetic field 40. In the wear-free operating state, the combined magnetic field 40 represents a reference magnetic field, indicated by bracket 64.

The occurrence of a state of wear on the clutch 10 reduces the circumferential clearance 23 between the first and second magnets 32, 34. This also results in an alteration to the combined magnetic field 40. As wear is encountered over time, as indicated by arrow 29 and defined by a wear-afflicted operating state, indicated by bracket 78, the measurement signal has a reduced pulse width 33 compared to the wear-free operating state, i.e. in the reference magnetic field 64. Similarly, the gradient 75 of the magnetic flux density in the surroundings of a maximum 73 is greater than in the reference magnetic field 64.

In a second method step, at least one of the physical variables of the combined magnetic field 40 is detected. In a third method step, a deviation is ascertained between the reference magnetic field 64 and the at least one physical variable detected in the second method step. It is hereby additionally possible to take into account an existing torque in the clutch 10. Then, in a fourth method step, the existing state of wear of the clutch 10 is ascertained based on the ascertained deviation. At least the second, third and fourth method steps can be executed by a computer program product which is executed on the evaluation unit 60.

Figure 4:
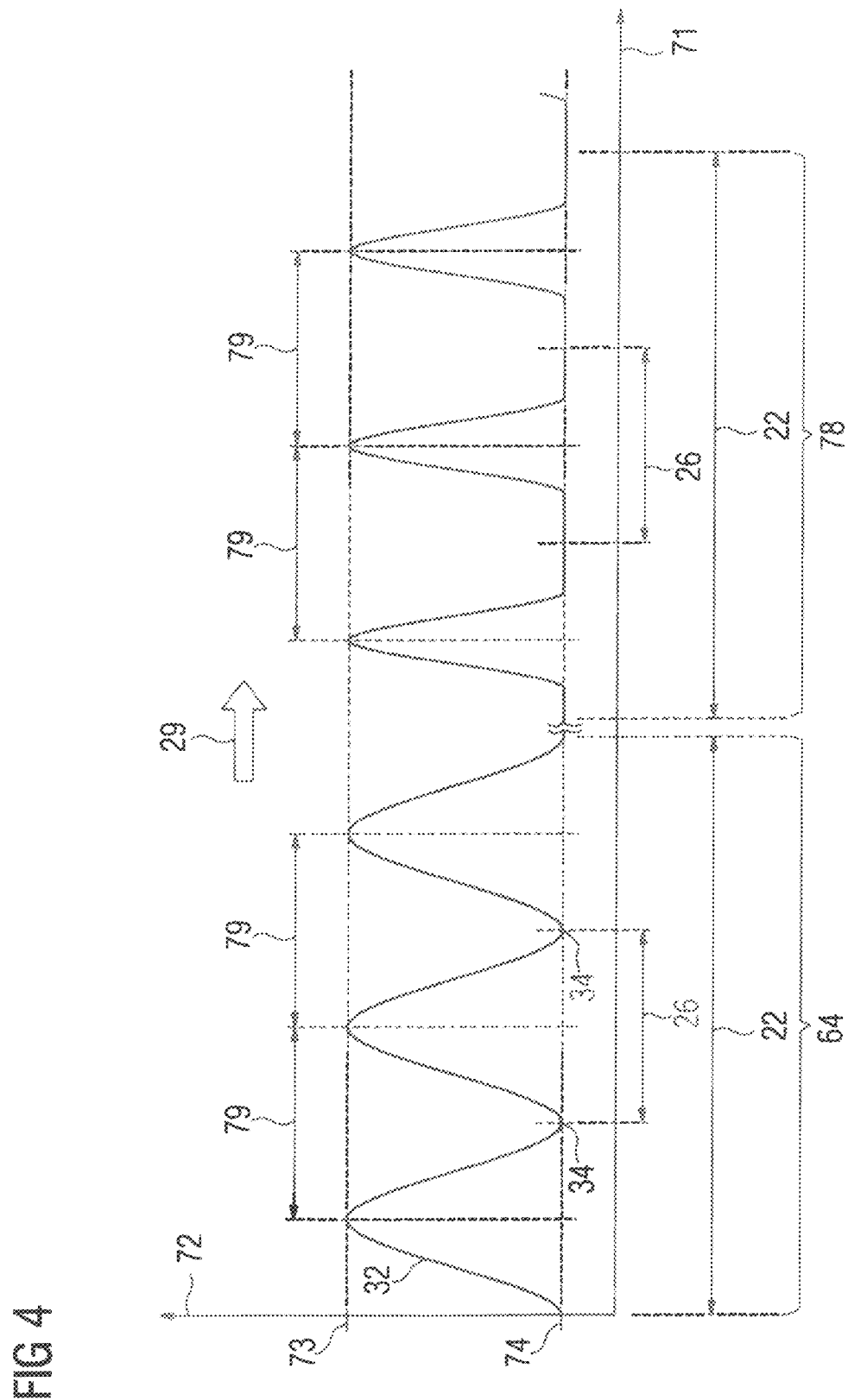
FIG. 4 is a diagram of a sequence of a modification of method steps in accordance with the invention for ascertaining a state of wear of a clutch.

FIG. 4 illustrates a diagram of a sequence of a modification of method steps in accordance with the invention for ascertaining a state of wear of a clutch. The diagram has horizontal time axis 71 mapping the sequence of the circumferential motion 24 of the clutch 10, and a vertical value axis 72 on which a field line angle detected by a sensor apparatus 50 is plotted in terms of magnitude. The diagram assumes a state in which the first method step, i.e. the initiation of an intended operational state of the clutch 10, has already taken place. The diagram substantially shows the course of a measurement signal for a field line angle detected in a marginal axial region 43. A combined magnetic field 40 with a course of this kind of the detected field line angle 38 is, for example, Illustrated in FIG. 2. The field line angle 38 represents the physical variable ascertained in the second method step, as described above with reference to FIG. 3.

In a wear-free state, the field line angle 38 is substantially zero, i.e. parallel to the axis of rotation 15 of the clutch 10, corresponding to a minimum 74. When the first magnet 32 approaches the sensor apparatus 50, the magnitude of the field line angle 38 increases. In the region of a vertex 47 of a loop 45 formed by a field line 35 of the combined magnetic field 40, the detected field line angle 38 reaches a maximum 73. This maximum 73 corresponds to a right angle. When the first magnet 32 passes the sensor apparatus 50, the detected field line angle 38 reaches a minimum. The first magnet 32 is substantially arranged axially aligned on the first clutch half 12. Thus, in the region of the first magnet 32, the field lines 35 of the combined magnetic field 40 substantially enter the first magnet 32 parallel to the axis of rotation 15. In the region between the first and second magnets 32, 34, the combined magnetic field 40 also has field lines 35 describing a loop 45. In the region of a vertex 47 of this loop 45, the field line angle 38 reaches a maximum 73 in terms of magnitude, which in FIG. 4 lies between reference characters 32 and 34. Similarly to the first magnet 32, the combined magnetic field 40 also passes the second magnet 34 where the field lines 35 therefore also enter substantially parallel to the axis of rotation 15 and the field line angle 38 returns to a minimum 74, i.e. substantially zero. The three maxima 73 and minima 74 of the field line angle 38 described are traversed in the period 22 which is predetermined by a rotational speed of the clutch 10. In each case, there are intervals between the minima 74, which are i.a. determined by the compressive force upon the damping elements 16 and which are present in the circumferential direction between the first and second clutch halves 12, 14. Furthermore, there are time maxima intervals 79 between the maxima 73 of the field line angle 38. The ratio of the durations of the respective maxima intervals 79 and/or the absolute values thereof vary with progressive wear as indicated by arrow 29. The maxima intervals 79 characterize the combined magnetic field 40, wherein a low-wear state, as depicted on the left in FIG. 4, depicts a reference magnetic field 64, and the maxima intervals 79, as depicted on the right in FIG. 4, respectively depict the existence of a combined magnetic field 40 relative to which a deviation is determined in the third method step, from which in turn the state of wear is ascertained in the fourth method step.

Figure 5:
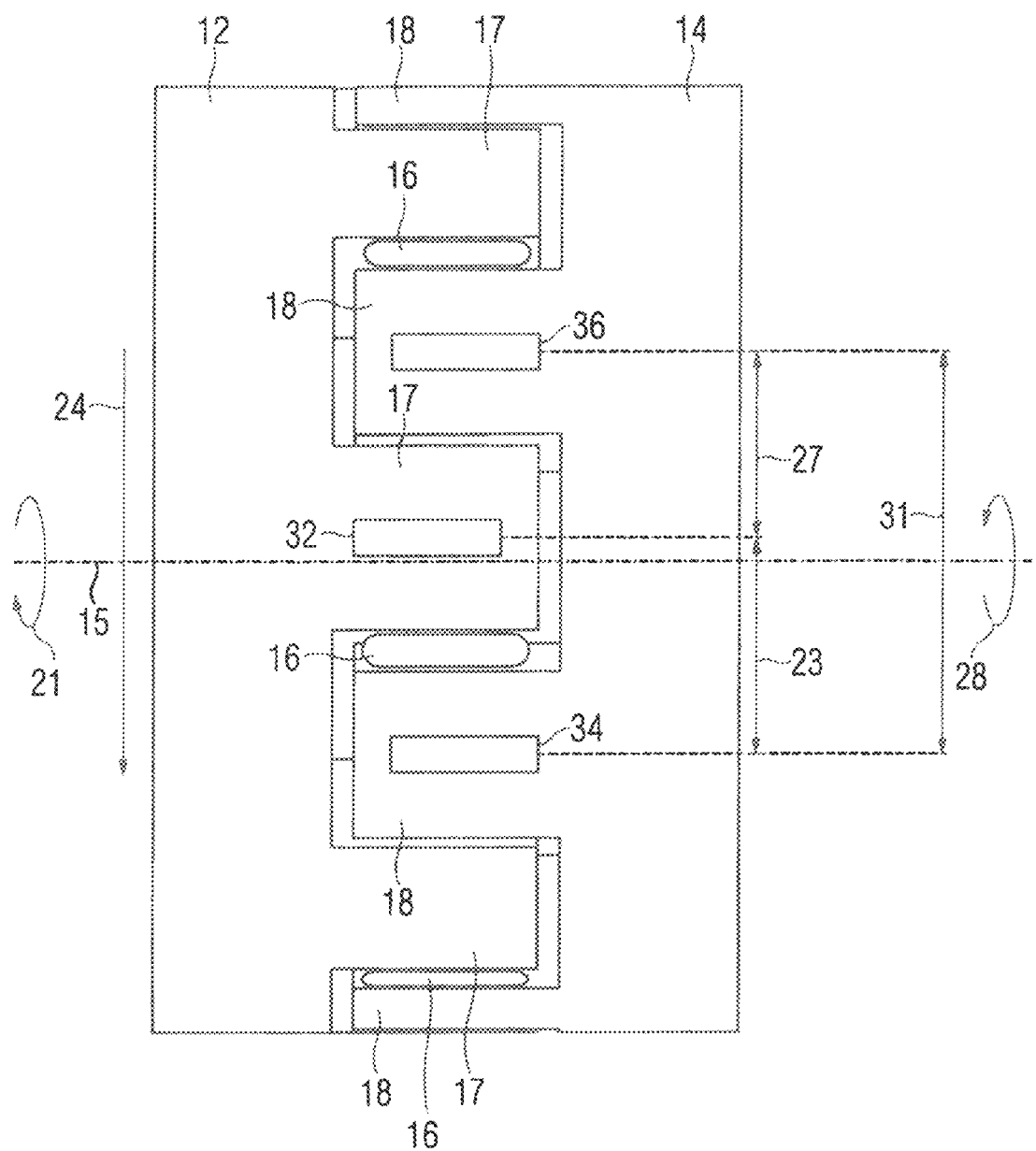
FIG. 5 is a schematic illustration of a second embodiment of a clutch according to the invention.

FIG. 5 is a schematic illustration of a second embodiment of a clutch according to the invention, generally designated by reference numeral 100. Parts corresponding with those in FIG. 1 are denoted by identical reference numerals. The clutch 100 includes a first clutch half 12 and a second clutch half 14. During operation, the clutch 100 rotates with a rotational speed about an axis of rotation 15, as indicated by arrow 21, to introduce a torque about the axis of rotation 15. The first clutch half 12 has a plurality of first claws 17 and the second clutch half 14 a plurality of second claws 18 so that the clutch 100 is embodied as a claw clutch. Flexible damping elements 16 made of rubber or an elastomer are arranged between the first and second claws 17, 18. The torque introduced into the first clutch half 12 drives a load 28 that belongs to an output unit. This causes a circumferential motion (arrow 24) in a circumferential direction corresponding to the direction of rotation (arrow 21) of the torque to be transmitted from the first clutch half 12 to the second clutch half 14. Flexible damping elements 16 are clamped between the first and second claws 17, 18 and compressed by a compressive force. This results in the establishment of a circumferential clearance 19 between a first claw 17 and a second claw 18. Wear on the clutch 100, in particular on the flexible damping elements 16, causes the circumferential clearance 19 between the first and second claws 17, 18 to change. This corresponds to a twist angle between the first and the second clutch half 12, 14.

The first magnet 32 is arranged on the outer surface of the first clutch half 12 in the region of a first claw 17. The second magnet 34 is arranged on the outer surface of the second clutch half 14 in the region of a second claw 18. Furthermore, a third magnet 36 is arranged on a further second claw 18 of the second clutch half 14. During operation of the clutch 100, the second and third magnets 34, 36 are arranged with an inalterable installation clearance 31 to one another. The first magnet 32 is positioned between the second and third magnets 34, 36 in the circumferential direction. As a result, a first circumferential clearance 23 is established between the first and second magnets 32, 34, and a second circumferential clearance 27 is established between the first and third magnets 32, 36. During a circumferential motion of the clutch 100, the magnets 32, 34, 36 pass a sensor apparatus 50 (not shown here) with a first time difference and a second time difference, which correspond to the first and second circumferential clearance 23, 27, respectively.

Wear on the damping elements 16 can alter the first and second circumferential clearances 23, 27 and hence also the first and second time differences. This causes a change of a combined magnetic field 40, not shown in further detail, embodied by the first, second and third magnets 32, 34, 36. Such a change induced by wear can be detected by the sensor apparatus 50 in a manner as described above.

Figure 6:
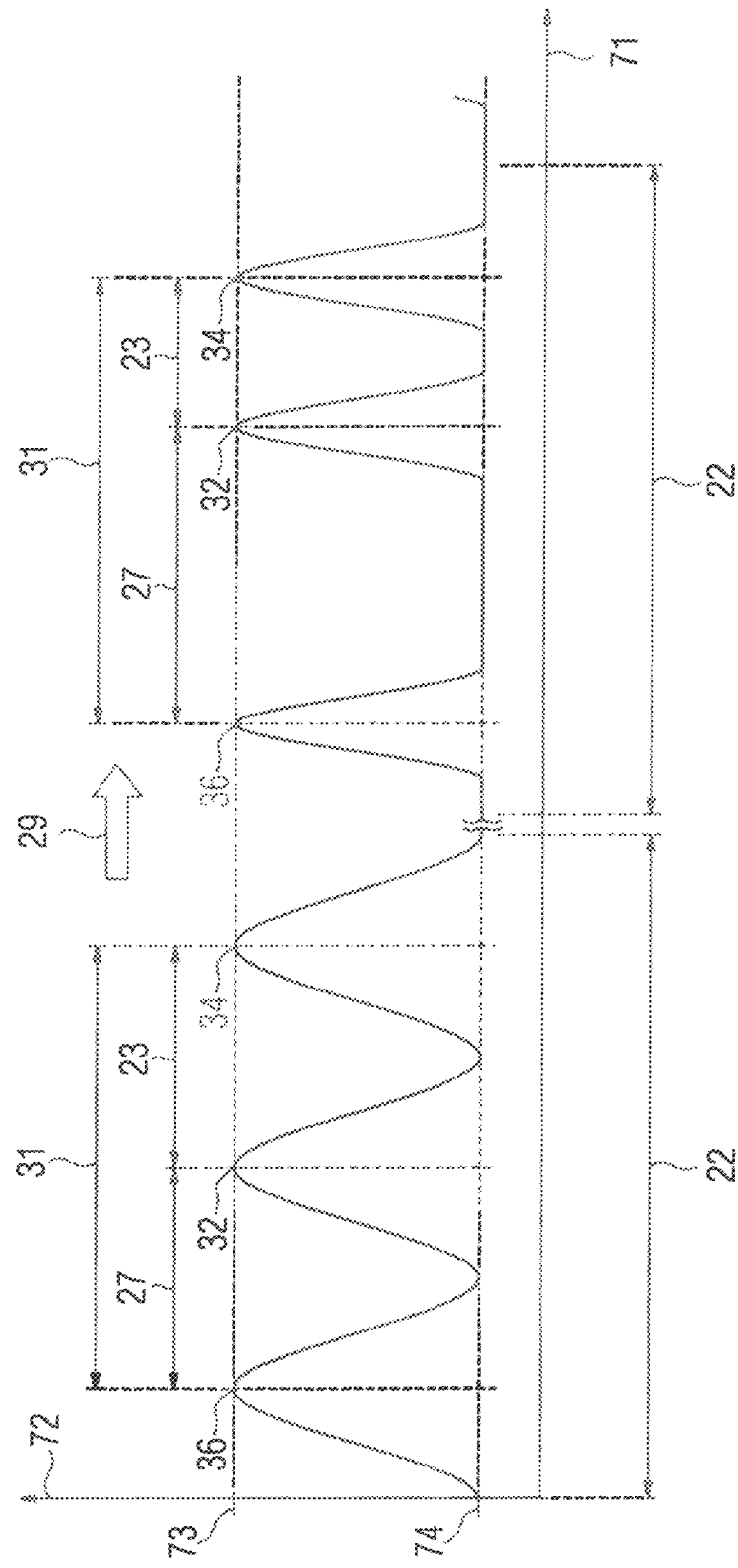
FIG. 6 is a diagram of a sequence of yet another modification of method steps in accordance with the invention for ascertaining a state of wear of a clutch.

FIG. 6 illustrates a diagram of a sequence of yet another modification of method steps in accordance with the invention for ascertaining a state of wear of a clutch 10 or 100. The diagram has a horizontal time axis 71 mapping the sequence of the circumferential motion of the clutch, and a vertical value axis 72 on which a flux density detected by a sensor apparatus 50 is plotted in terms of magnitude. The diagram assumes a state in which a first method step involves conclusion of initiation of an intended operational state of the clutch. The diagram substantially shows the course of a measurement signal for a flux density in a region in which the first and second claws 17, 18 of the clutch halves 12, 14 interlock. The flux density represents the physical variable ascertained in a second method step. Passage of the first, second and third magnets 32, 34, 36 can be detected as a sequence of maxima 73 and minima 74 of the flux density.

In a low-wear state, as depicted on the left in FIG. 6, the first, second and third magnets 32, 34, 36 pass the sensor apparatus 50 (not shown). The first magnet 32 is arranged along a circumferential direction, in which the circumferential motion (arrow 24) takes place between the second and third magnets 34, 36. In the low-wear state, there is a first circumferential clearance 23 between the first and second magnets 32, 34 and a second circumferential clearance 27 between the first magnet 32 and the third magnet 36. Between the second and third magnets 34, 36, there is an installation clearance 31 that cannot be altered during operation. In the intended operational state, which is initiated in the first step, there is a period 22 in the pattern of the measurement signal corresponding to a rotational speed of the clutch.

Wear, Indicated by arrow 29, occurs during the operation of the clutch and affects the damping elements 16 between the first and second clutch halves 12, 14 so that the first and second circumferential clearances 23, 27 between the first, second and third magnets 32, 34, 36 change. In the presence of wear, as shown on the right in FIG. 6, the first circumferential clearance 23 between the first and second magnets 32, 34 is reduced compared to the low-wear state. The second circumferential clearance 27 between the first and third magnets 32, 36 is increased compared to the low-wear state. The first and second circumferential clearances 23, 27 correspond hereby to a first and second time differences between maxima 73 of the measurement signal. Thus, the first and second time differences characterize a combined magnetic field 40 (not shown), which is created by the first, second and third magnets 32, 34, 36. Hence, the changes to the first and second time differences shown on the right in FIG. 6 enable wear that has occurred to be described and measured. In a third method step, a deviation of the combined magnetic field 40 is depicted on the basis of which a wear-induced twist angle between the first and second clutch halves 12, 14 is ascertained in a fourth method step. This in turn also enables determination of the presence of wear.

Figure 7:
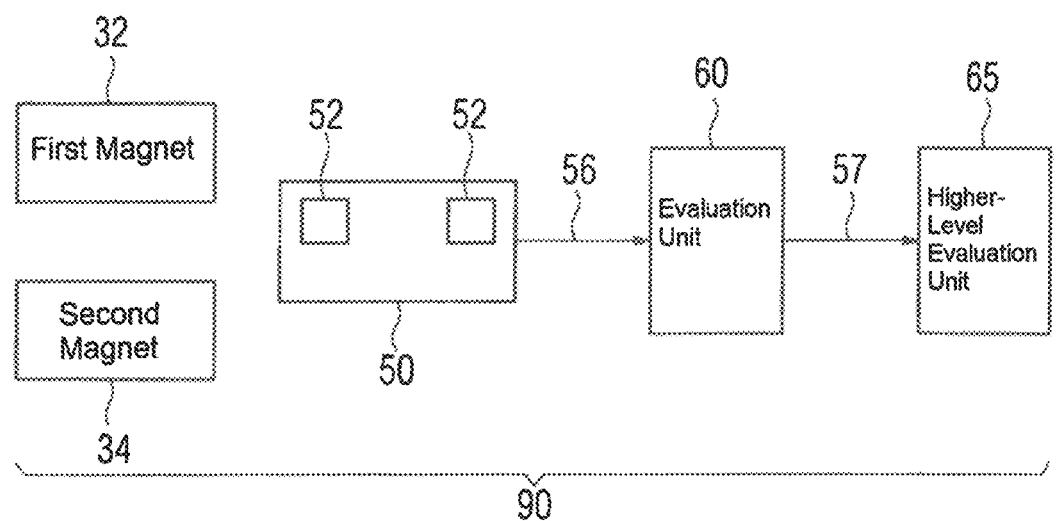
FIG. 7 is a schematic illustration of a system according to the invention.

FIG. 7 is a schematic illustration of a system according to the invention, generally designated by reference numeral 90, for detecting the presence of wear of clutch 10 by way of example. In addition to the clutch 10, the system 90 includes a sensor apparatus 50, which has a plurality of sensors 52. The sensors 52 are individually or in combination suitable for detecting an alteration to a combined magnetic field 40 created by the first and second magnets 32, 34 of the clutch 10. The sensor apparatus 50 generates measurement signals that are transmitted to an evaluation unit 60 via a communicative data connection 56. The evaluation unit 60 has a memory in which data relating to a reference magnetic field 64 is permanently stored. A computer program product embodied at least to evaluate the measurement signals is also stored on the evaluation unit 60. The computer program product further processes the measurement signals to form calculated data, which is forwarded to a higher-level evaluation unit 65 via a communicative data connection 57. A computer program product is also stored in an executable manner on the higher-level evaluation unit 65. The computer program products of the evaluation unit 60 and the higher-level evaluation unit 65 are connected together via the communicative data connection 57 and execute a method for ascertaining a state of wear in the clutch 10. The evaluation unit 60 is assigned directly to the sensor apparatus 50 and/or the clutch 10. The communicative data connection 57 between the evaluation unit 60 and the higher-level evaluation unit 65 is embodied as a network connection or internet connection. Furthermore, the higher-level evaluation unit 65 is embodied as a computer cloud, server or master computer.

Figure 8:
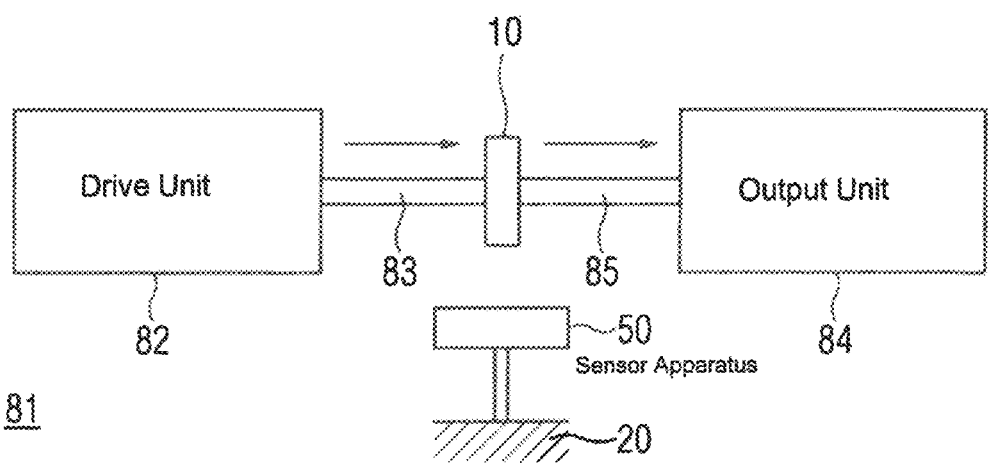
FIG. 8 is a schematic illustration of an industrial application according to the invention.

FIG. 8 is a schematic illustration of an industrial application according to the invention, generally designated by reference numeral 81. The industrial application 81 includes a drive unit 82 via which a torque with a rotational speed, i.e. drive power, is provided via an output shaft 83. The output shaft 83 is connected to an input shaft 85 via a clutch 10, 100 so that the rotational speed and the torque, i.e. the drive power, is transmitted to the input shaft 85. The input shaft 85 belongs to an output unit 84, which can, for example, be embodied as a mill, vertical mill, sugar mill, cement mill, rock crusher, conveyor belt, pump, roller press, apron conveyor, tube mill, rotary kiln, rotary mechanism, agitator, lifting apparatus, garbage compactor or scrap press. The clutch 10, 100 is embodied as described above. The first and second magnets 32, 34 generate a combined magnetic field 40 (not shown), the alterations of which, which are created by wear on the clutch 10, 100, can be detected by a sensor apparatus 50, which is rigidly connected to the surroundings 20 of the clutch 10, 100. The surroundings 20 can, for example, be a wall or the foundation. The sensor apparatus 50 is embodied for contactless detection of wear in the clutch and can hence be retrofitted separately.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A clutch, comprising:
a first clutch half;
a second clutch half;
a wear-afflicted damping element arranged between the first and second clutch halves;
a first magnet arranged on the first clutch half; and
a second magnet arranged on the second clutch half,
wherein the first and second magnets interact to enable a contactless detection of a state of wear of the clutch.

2. The clutch of claim 1, wherein the first and second magnets form a combined magnetic field and are configured for movement relative to one another in order to alter the combined magnetic field.

3. The clutch of claim 2, wherein the combined magnetic field is altered by at least one of a change in a magnetic flux density, a change in a gradient of the magnetic flux density and a change of direction of magnetic field lines of the combined magnetic field.

4. The clutch of claim 2, wherein the combined magnetic field is altered in a region between the first and second magnets, or in a region next to the first or second magnets, or both.

5. The clutch of claim 1, wherein the first magnet is moveable along a circumferential direction relative to the second magnet.

6. The clutch of claim 1, further comprising a third magnet arranged on the second clutch half, said first magnet arranged between the second and third magnets in a circumferential direction.

7. An industrial application, comprising:
a drive unit including an output shaft;
an output unit including an input shaft; and
a clutch, as set forth in claim 1, the clutch connecting the input shaft and the output shaft to one another in a torque-transmitting manner.

8. A sensor apparatus, comprising a sensor configured to detect a physical variable of a magnetic field for ascertaining a state of wear of a clutch as set forth in claim 1.

9. A system, comprising:
a clutch including a first clutch half, a second clutch half, a wear-afflicted damping element arranged between the first and second clutch halves, and first and second magnets arranged on the first and second clutch halves, respectively, for contactless detection of a state of wear of the clutch, said first and second magnets forming a combined magnetic field; and
a sensor apparatus including a sensor configured to detect a physical variable of the magnetic field.

10. The system of claim 9, wherein the sensor apparatus is arranged in a stationary manner in a surrounding area of the clutch and positioned in relation to the clutch so as to detect at least one region of the combined magnetic field.

11. The system of claim 9, wherein the sensor apparatus is configured to detect at least one of a change in a magnetic flux density, a change in a gradient of the magnetic flux density and a change of direction of magnetic field lines of the combined magnetic field.

12. The system of claim 9, wherein the sensor is embodied as a Hall sensor or reed contact.

13. A method for ascertaining a state of wear of a clutch having a first clutch half with a first magnet and a second clutch half with a second magnet, and a wear-afflicted damping element arranged between the first clutch half and second clutch half, with the first and second magnets forming a combined magnetic field, said method comprising:
initiating an intended operation of the clutch;
detecting a physical variable of the combined magnetic field by a sensor apparatus;

ascertaining a deviation between the combined magnetic field and a reference magnetic field based on the physical variable;

ascertaining a state of wear of the wear-afflicted damping element of the clutch as a function of the deviation between the combined magnetic field and the reference magnetic field, wherein the deviation of the combined magnetic field corresponds to a wear-induced twist angle between the first and second clutch halves.

14. The method of claim 13, wherein the physical variable is detected in a contactless manner.

15. The method of claim 13, wherein the deviation between the combined magnetic field and the reference magnetic field is ascertained by taking into account an existing torque in the clutch.

16. The method of claim 13, further comprising filtering interference from a measurement signal of the physical variable of the combined magnetic field.

17. A computer program product for receiving and processing a measurement signal from a sensor apparatus, said computer program product comprising a computer program embodied in a non-transitory computer readable medium, wherein the computer program, when loaded into a processor and executed by the processor, causes the processor to perform the method of claim 13.

18. An evaluation unit for evaluating a measurement signal from a sensor apparatus for detecting a physical variable of a magnetic field, said evaluation unit comprising:
- a memory storing data relating to a reference magnetic field; and
- a computing unit for executing a computer program product comprising a computer program embodied in a non-transitory computer readable medium, wherein the computer program, when loaded into a processor and executed by the processor, causes the processor to perform the method of claim 13.

* * * * *